US011040721B2

(12) United States Patent
Benoit et al.

(10) Patent No.: US 11,040,721 B2
(45) Date of Patent: Jun. 22, 2021

(54) CAUSAL ANALYTICS FOR POWERTRAIN MANAGEMENT (71) Applicant: 3M INNOVATIVE PROPERTIES COMPANY, St. Paul, MN (US)

(72) Inventors: Gilles J. Benoit, Minneapolis, MN (US); Brian E. Brooks, St. Paul, MN (US); Ryan C. Shirk, Mendota Heights, MN (US); Michael E. Nelson, Woodbury, MN (US); Craig R. Schardt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/753,188

(22) PCT Filed: Nov. 27, 2018

(86) PCT No.: PCT/IB2018/059352
§ 371 (c)(1),
(2) Date: Apr. 2, 2020

(87) PCT Pub. No.: WO2019/106534
PCT Pub. Date: Jun. 6, 2019

(65) Prior Publication Data
US 2021/0070313 A1    Mar. 11, 2021

Related U.S. Application Data (60) Provisional application No. 62/593,405, filed on Dec. 1, 2017.

(51) Int. Cl.
*B60W 50/00* (2006.01)
*B60W 50/04* (2006.01)
*B60W 30/188* (2012.01)

(52) U.S. Cl.
CPC ........ *B60W 50/045* (2013.01); *B60W 30/188* (2013.01); *B60W 2050/0026* (2013.01);
(Continued)

(58) Field of Classification Search
CPC ............. B60W 50/045; B60W 30/188; B60W 2556/10; B60W 2556/45;
(Continued)

(56) References Cited

U.S. PATENT DOCUMENTS 5,109,696 A    5/1992    Bright et al.
5,890,992 A    4/1999    Salecker et al.
(Continued)

FOREIGN PATENT DOCUMENTS

EP    1 898 113        3/2008
EP    1 435 474 B1    5/2009
(Continued)

OTHER PUBLICATIONS

PCT International Search Report for PCT/IB2018/059352, dated Mar. 11, 2019, 5 pages.

*Primary Examiner* — Thomas E Worden
*Assistant Examiner* — Tiffany P Ohman
(74) *Attorney, Agent, or Firm* — C. Michael Geise (57) ABSTRACT

Methods for management of a powertrain system in a vehicle. The methods receive data or signals from multiple sensors associated with the vehicle. Optimum thresholds for classifications of the sensor data can be changed based injecting signals into the powertrain system and receiving responsive signals. Expected priorities for the sensor signals can be altered based upon attributes of the signals and confirming actual priorities for the signals. Look-up tables for engine management can be modified based upon injecting signals into the powertrain system and measuring a utility of the responsive signals. The methods can thus (Continued)

dynamically alter and modify data for powertrain management, such as look-up tables, during vehicle operation under a wide range of conditions.

9 Claims, 6 Drawing Sheets

(52) U.S. Cl.
CPC . *B60W 2050/0075* (2013.01); *B60W 2556/10* (2020.02); *B60W 2556/45* (2020.02); *B60W 2710/1061* (2013.01)

(58) Field of Classification Search
CPC . B60W 2050/0026; B60W 2050/0075; B60W 2710/1061; H04W 4/46
USPC .......................................................... 701/54
See application file for complete search history.

(56) References Cited

U.S. PATENT DOCUMENTS

| | | |
|---|---|---|
| 6,351,675 B1 * | 2/2002 | Tholen ............... A61N 1/37235 607/59 |
| 6,807,472 B2 | 10/2004 | Ford et al. |
| 7,111,611 B1 | 9/2006 | Lyon |
| 7,469,177 B2 | 12/2008 | Samad et al. |
| 8,532,895 B2 | 9/2013 | Desfriches et al. |
| 9,682,710 B2 | 6/2017 | Darnell et al. |
| 2004/0015255 A1 | 1/2004 | Davis |
| 2007/0067078 A1 | 3/2007 | Salman et al. |
| 2009/0277244 A1 | 11/2009 | Doll et al. |
| 2011/0288722 A1 | 11/2011 | Nicosia et al. |
| 2014/0297225 A1 | 10/2014 | Petroski et al. |
| 2017/0137012 A1 | 5/2017 | Mao et al. |
| 2017/0207624 A1 | 7/2017 | Brooks et al. |

FOREIGN PATENT DOCUMENTS

| | | |
|---|---|---|
| EP | 2 573 539 | 3/2013 |
| GB | 2 319 820 | 6/1998 |
| WO | WO 2015/036692 | 3/2015 |
| WO | WO 2016/011007 | 1/2016 |
| WO | WO 2016/011012 | 1/2016 |
| WO | WO 2016/011014 | 1/2016 |
| WO | WO 2016/064721 | 4/2016 |
| WO | WO 2016/115002 | 7/2016 |

* cited by examiner

CAUSAL ANALYTICS FOR POWERTRAIN MANAGEMENT

BACKGROUND

The performance of motor vehicles—their reliability, safety, efficiency, power and torque—can be drastically improved through sensing key parameters and using those results to direct the operations and maintenance of their powertrain, for example by enabling active management such as variable valve timing and variable length intake manifolds in order to optimize power and torque across the range of engine speed while providing improved fuel efficiency. Powertrain here is used to describe the main components that generate power and deliver it to the road surface (in the case of motor vehicles), rail, water, or air. In an automobile, for example, a powertrain includes the internal combustion engine, transmission, drive shafts, differentials, and the final drive. In battery electric powertrains and hybrid systems, it also includes the batteries and electric motors.

An ever-increasing number and type of sensors are used to monitor powertrain performance. These sensors can include air flow and temperature meters, air-fuel ratio meter, barometric sensor, battery level and temperature meters, chassis level sensor, crankshaft position sensor, differential non-contacting angle sensor, engine coolant level and temperature sensors, exhaust gas and temperature sensors, fuel level sensor, HVAC sensor, in-cylinder pressure sensor, knock sensor, oil level and temperature sensor, oxygen sensor, speed sensor, throttle position sensor, tire-pressure monitoring sensor, torque sensor, transmission fluid and temperature sensor, vibration sensor, wheel speed sensor and more. These sensors are transducers, usually outputting analog signals representative of the measured properties. These outputs need to be characterized to map to specific values of those properties, and/or classified so that they may represent particular states of the world, such as overheating, improper lubrication, detonation (referred to as spark knock), or leak-induced compression loss. Characterization and interpretation of sensor data is accomplished by Electronic Control Units (ECU) and in today's luxury and hybrid cars, their number is upward of 100. This large number is driven by the increasing number of features and complexity of modern vehicles as well as by the fact that ECUs can reduce overall cost and weight by eliminating the need for long wires across the car to carry each individual signal. Calibration of these sensor systems (physical sensor+ECU) is usually accomplished through extensive bench testing, while the sensors may have various interferences in the environment surrounding them once deployed. In-situ calibration of sensors would be preferred to improve accuracy and save development time and cost but is difficult due to the large variance that exists across powertrains and environmental conditions. In some instances, a control loop can be used as a feedback mechanism to continuously correct discrepancies between the measured signal representing the state of a process variable and its desired setpoint, for example to compensate for loss of accuracy as the sensor ages, but such strategies can only be used when the sensor system maps directly to a single control and is therefore limited to a single functionality.

The trend in electronic/electrical system architecture for automotive vehicles is to move away from dozens of distributed function-specific sensor systems to a handful of domain-centralized systems and ultimately to a single vehicle-centralized system that ingest data from multiple sensors to make inferences about higher-level functionalities such as overall performance or safety. As a result, fewer ECUs will have to ingest and interpret a larger amount of data potentially uncertain and/or contradictory. The trend in analyzing such sensor data is "big data," which uses large amounts of powertrain sensor historical data to build models used for regression and classification and subsequently for directing responses based on expected utility. These big-data models, however, are largely limited to correlations as they mine historical data often filled with bias and confounding effects to build the models, limiting their prescriptive effectiveness for actively directing process controls. Furthermore, these big-data models typically require large volumes of data that hinder highly granular understanding of powertrain performance and health across space and time, for example under particular loads and conditions. Finally, these machine learning techniques and improved control models assume that the underlying system is stationary enough over time for historical data to be accurately representative of the current state of the world and tend to fail catastrophically when it is in fact dynamic.

Signal injections in the form of Design Of Experiments (DOEs) are also commonly used for ECU calibration, such as mapping volumetric efficiency as a function of intake manifold pressure, throttle position, and engine speed in the case of the Engine Control Unit. These signal injections have been large and human mediated, and used to generate look-up tables robust under a broad range of conditions rather than optimized for any particular one. Powertrain management would benefit greatly from real-time cause-and-effect understanding of sensor responses, remedying the issues with data-driven diagnosis and prescriptive approaches and allowing for real-time, granular, and fine-tuned powertrain monitoring and management.

SUMMARY

A first method for automatically generating and applying causal knowledge to the management of a powertrain system in a vehicle includes injecting randomized controlled signals in powertrain control decisions and ensuring the signal injections occur within normal operational ranges and constraints. The method also includes receiving data from a plurality of sensors associated with the vehicle in response to the signal injections and parsing those data into system responses associated with the injected signals, computing confidence intervals about the causal relationships between powertrain signals and a utility function derived from the received data, and selecting optimal signals for the powertrain control decisions based on the computed causal knowledge and uncertainty about expected utility.

A second method for management of a powertrain system in a vehicle includes receiving data from a plurality of sensors associated with the vehicle and injecting signals into the Electronic Control Unit used to classify and/or interpret those data, for example by perturbing the value of the criterion beta for classification in signal detection theory. The method also includes receiving data from a plurality of sensors associated with the vehicle in response to the signal injections and parsing those data into system responses associated with the injected signals, computing confidence intervals about the causal relationships between sensor and ECU signals and a utility function derived from the responsive data, and selecting optimal classification criteria based on the computed causal knowledge and uncertainty about their expected utility.

A third method for management of a powertrain system in a vehicle includes receiving signals from a plurality of sensors and/or Electronic Control Units associated with the vehicle, assigning expected priorities to those signals for use in controlling the powertrain system, computing confidence intervals about the causal relationships between signal attributes and a utility function reflecting the opportunity cost of prioritizing said signal, and optimizing the priorities for the received signals over time based upon their attributes and the expected opportunity cost of prioritizing them.

A fourth method for management of a powertrain system in a vehicle includes injecting signals into the powertrain system and receiving responsive signals, measuring a utility of the responsive signals, accessing stored data relating to engine management within the powertrain system, and updating such data based upon the utility of the responsive signals.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention include methods and systems for implementing experimental trials on powertrains in motor vehicles or other transportation vehicles. Variations in control parameters are selected to be introduced into powertrains to improve the value of learning from each experimental trial and promoting improved powertrain performance by computing expected values for both learning and performance. Those trials are used to manage the opportunity costs and constraints that affect the introduction of variations in powertrain control parameters and the generation of valid data that can be attributed to particular variations in those parameters.

The methods enable real-time fine-tuning of powertrain look-up tables that are initially calibrated for a broad range of use conditions. Most cars are used the vast majority of the time in a very specific geographic location associated with various unique characteristics including fuel composition, weather, elevation/air density, road types and conditions, congestion levels, and at fairly predictable times of the day. Experimental signal injection allows the vehicle control unit to continuously learn the optimum settings based on local and real-time conditions resulting in performance improvements over baseline look-up tables. The approach can also be used to automate initial vehicle calibration beyond what is done today at a domain/functional group level (e.g. powertrain, body control, safety) rather than at an individual function level (e.g. active fuel injection, Anti-lock Braking System), resulting in significant cost savings and shorter development time. Causal knowledge being a highly-transferable type of learning, collaborative learning among vehicles can further be used to reduce the development time and requirements ahead of launching a new model as well as eliminating the trade-off between local and global optimization, for example by allowing vehicles to share knowledge about optimum powertrain management under a particular load or in a particular or geographic area. Unlike other "big data" approaches, these methods rely on a relatively small data size, commensurate with existing data tables in vehicle powertrain systems, and therefore require relatively low computing power and capability, a significant source of power draw in modern vehicles.

Figure 1:
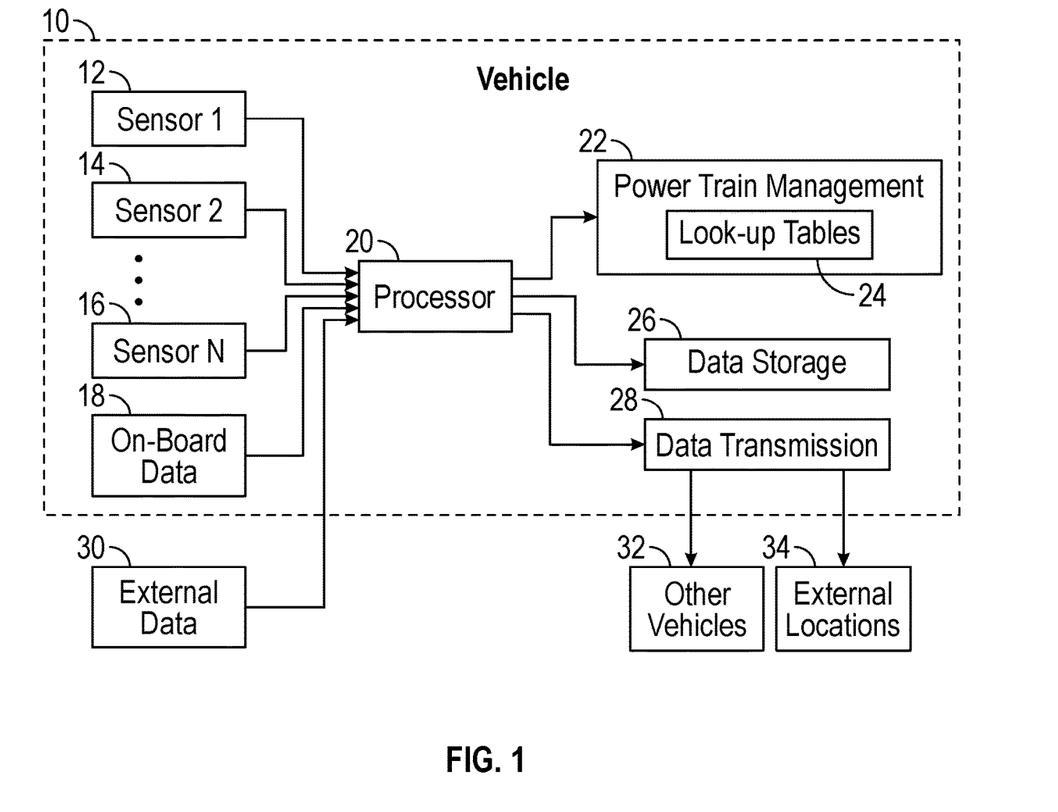
FIG. 1 is a diagram illustrating a causal analytics system for powertrain management in a vehicle.

FIG. 1 is a diagram illustrating a causal analytics system for powertrain management in a vehicle 10. The system includes a processor 20 receiving inputs from multiple sensors such as sensors 12, 14, and 16 within or associated with vehicle 10. Processor 20 can also receive or access on-board data 18 stored within vehicle 10 and external data 30 received from a source external to vehicle 10. Processor 20, under software or firmware control, provides output data for a powertrain management module 22, which can include look-up tables 24 for powertrain management and control, and can provide for data storage 26 for storage of historical data relating to powertrain management. Processor 20 can also provide for data transmission 28, including wireless transmission of powertrain management or other data to other vehicles 32 and external locations 34.

Figure 2:
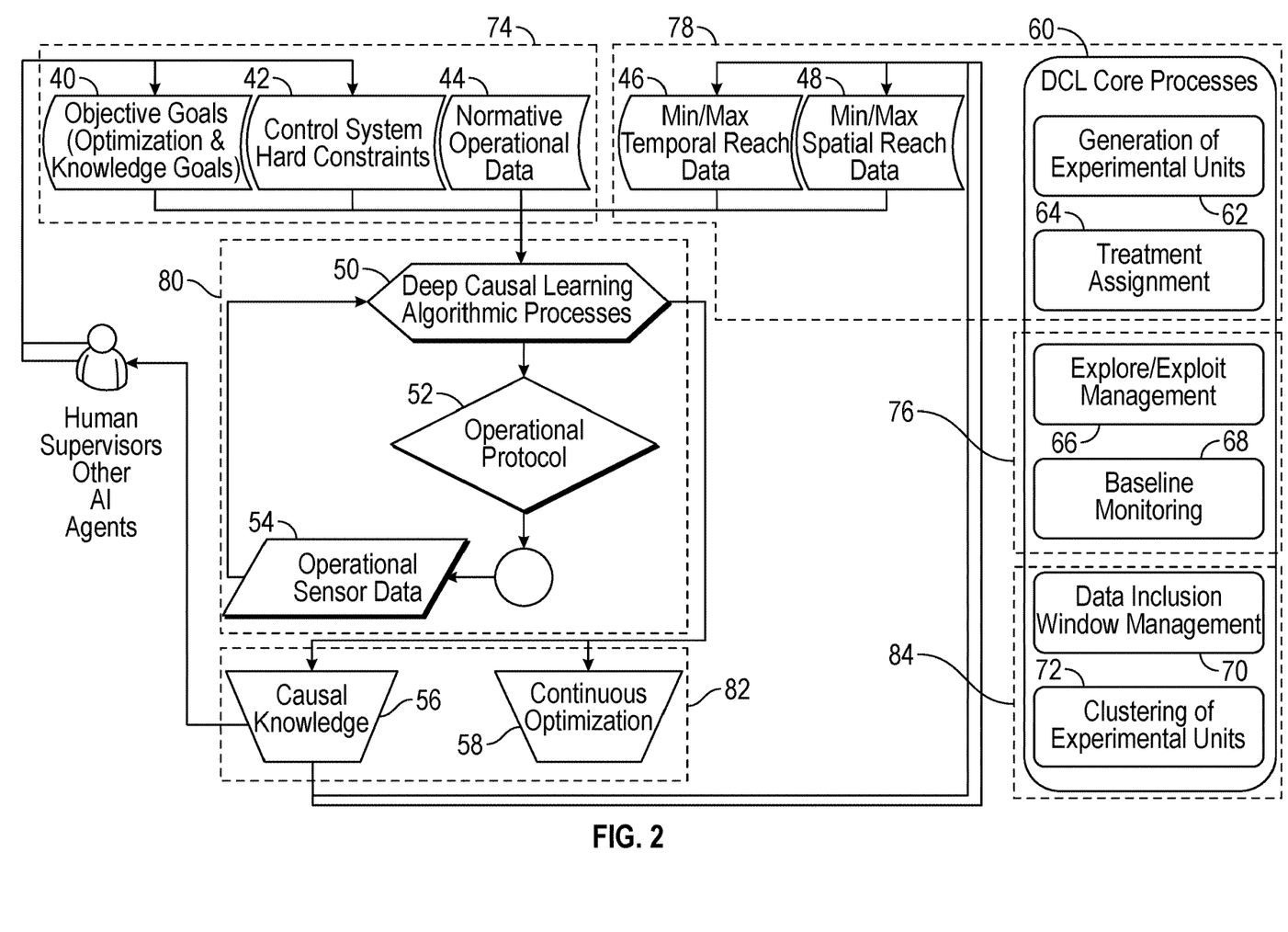
FIG. 2 is a block diagram of software modules and core processes for the causal analytics system.

FIG. 2 is a block diagram of software modules and core processes for the causal analytics system and for execution by processor 20.

The system includes the following modules: an objective goals (optimization knowledge and goals) module 40; a control system hard constraints module 42; a normative operational data module 44; a minimum/maximum temporal reach data module 46; a minimum/maximum spatial reach data module 48; a deep causal learning (DCL) algorithmic processes module 50; an operational protocol module 52; an operational/sensor data module 54; a causal knowledge module 56; and a continuous optimization module 58.

The DCL core processes 60 include the following: a generation of experimental units process 62; a treatment assignment process 64; an explore/exploit management process 66; a baseline monitoring process 68; a data inclusion window management process 70; and a clustering of experimental units process 72.

Figure 3:
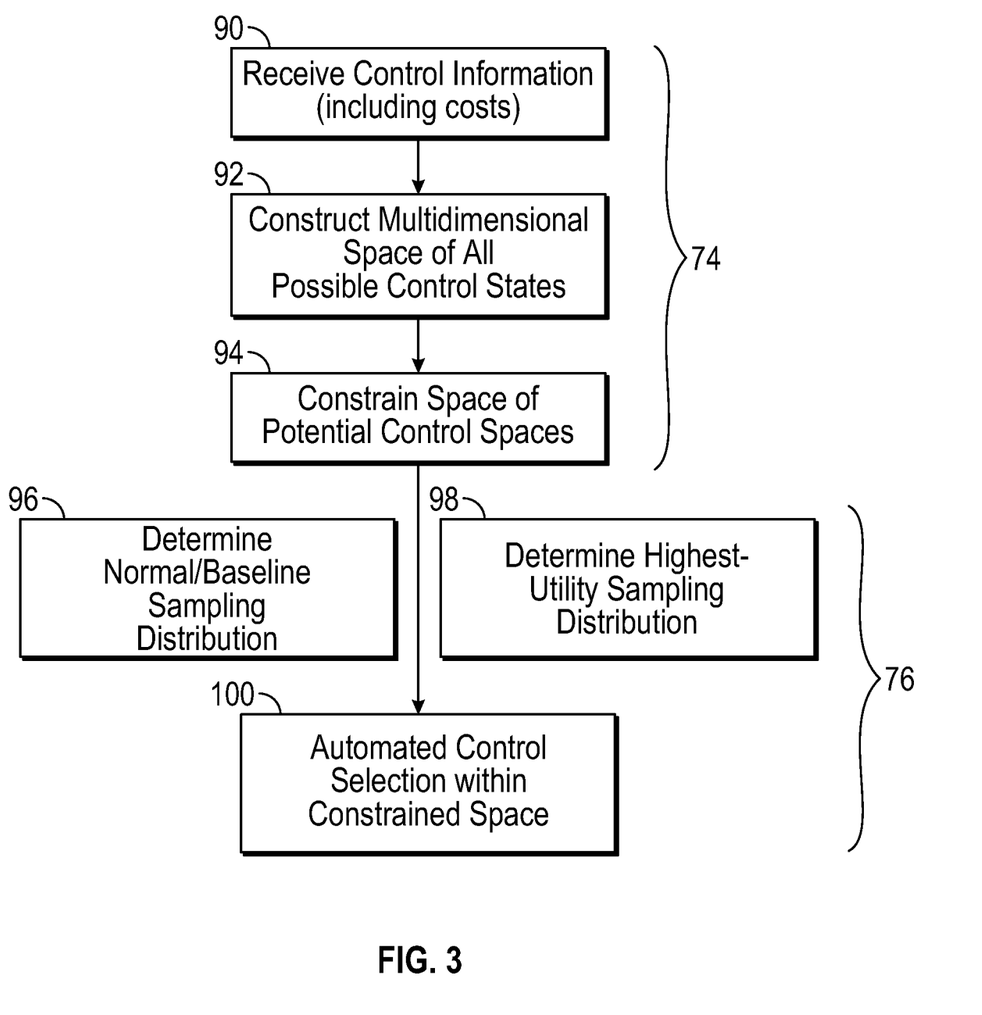
FIG. 3 is a flow chart of a search space method for the system.

FIG. 3 is a flow chart of a search space method for the modules and processes in sections 74 and 76 of the system. The search space method includes the following steps: receive control information (including costs) 90; construct multidimensional space of all possible control states 92; constrain space of potential control spaces 94; determine normal/baseline sampling distribution 96; determine highest utility sampling distribution 98; and automated control selection within constrained space 100.

Figure 4:
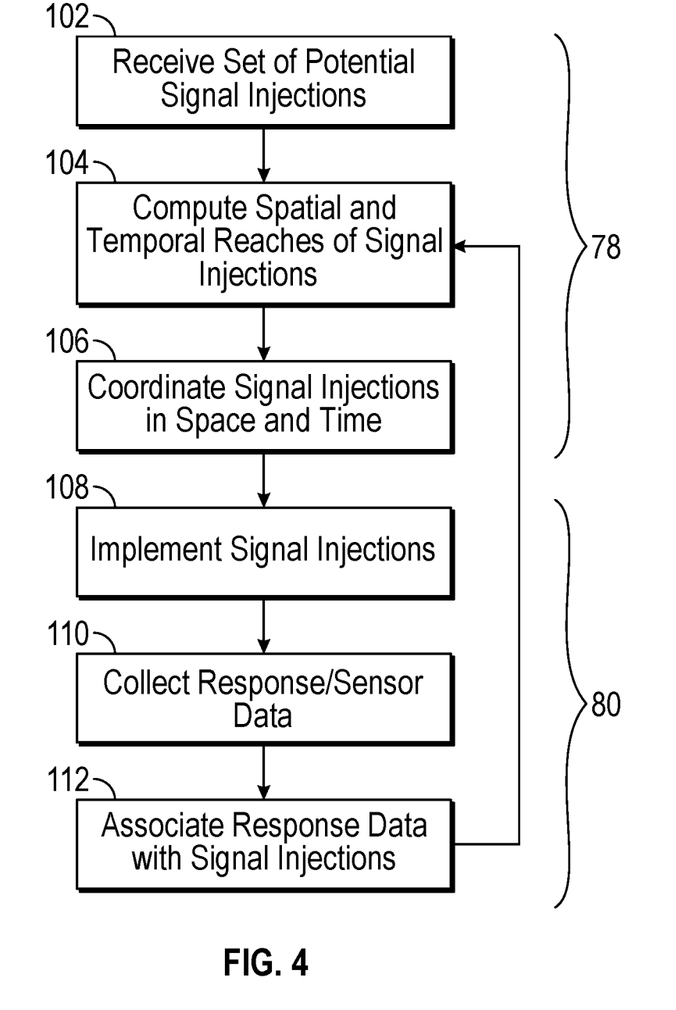
FIG. 4 is a flow chart of a signal injection method for the system.

FIG. 4 is a flow chart of a signal injection method for the modules and processes in sections 78 and 80 of the system. The signal injection method includes the following steps: receive set of potential signal injections 102; compute spatial and temporal reaches of signal injections 104; coordinate signal injections in space and time 106; implement signal injections 108; collect response/sensor data 110; and associate response data with signal injections 112.

Figure 5:
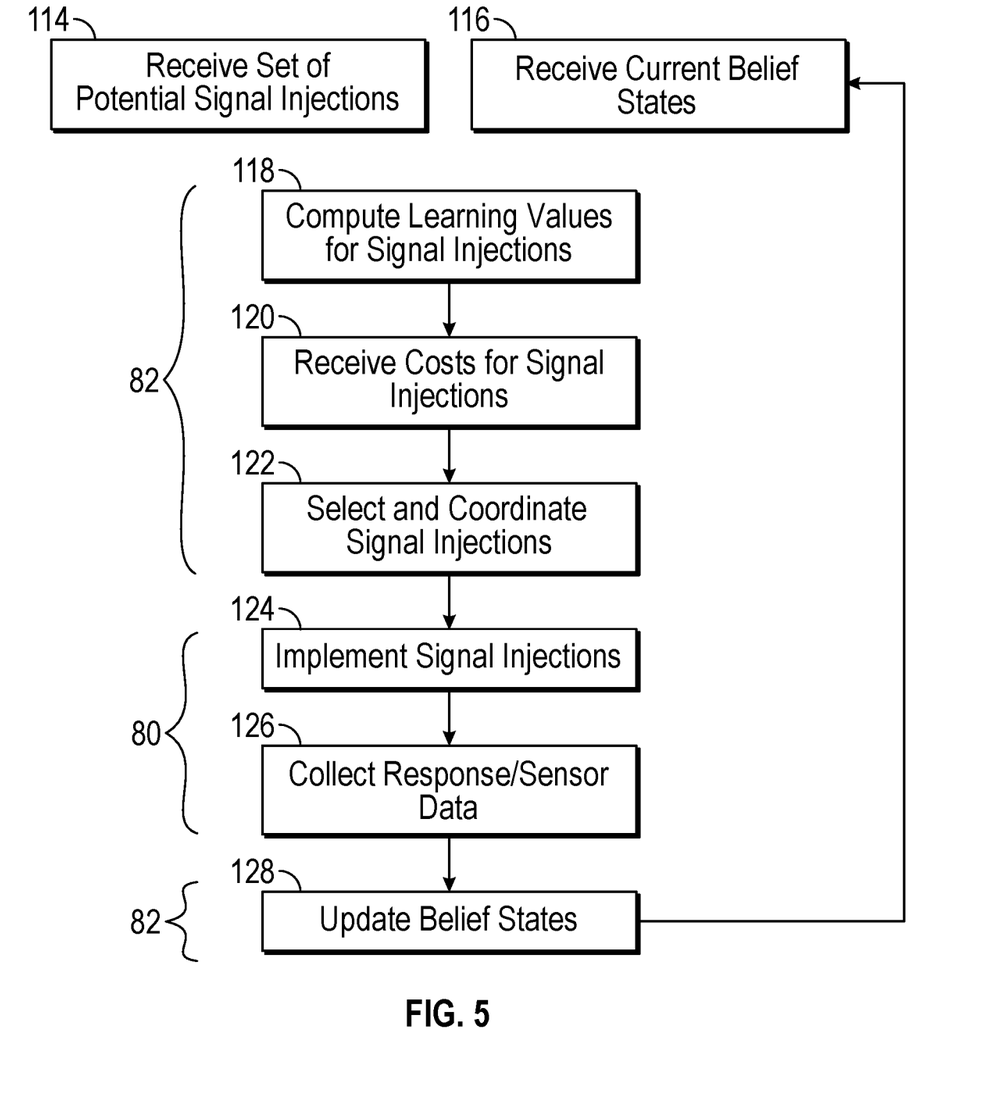
FIG. 5 is a flow chart of a continuous learning method for the system.

FIG. 5 is a flow chart of a continuous learning method for the modules and processes in sections 80 and 82 of the system. The continuous learning method includes the following steps: receive set of potential signal injections 114; receive current belief states 116; compute learning values for signal injections 118; receive costs for signal injections 120;

select and coordinate signal injections 122; implement signal injections 124; collect response/sensor data 126; and update belief states 128.

Figure 6:
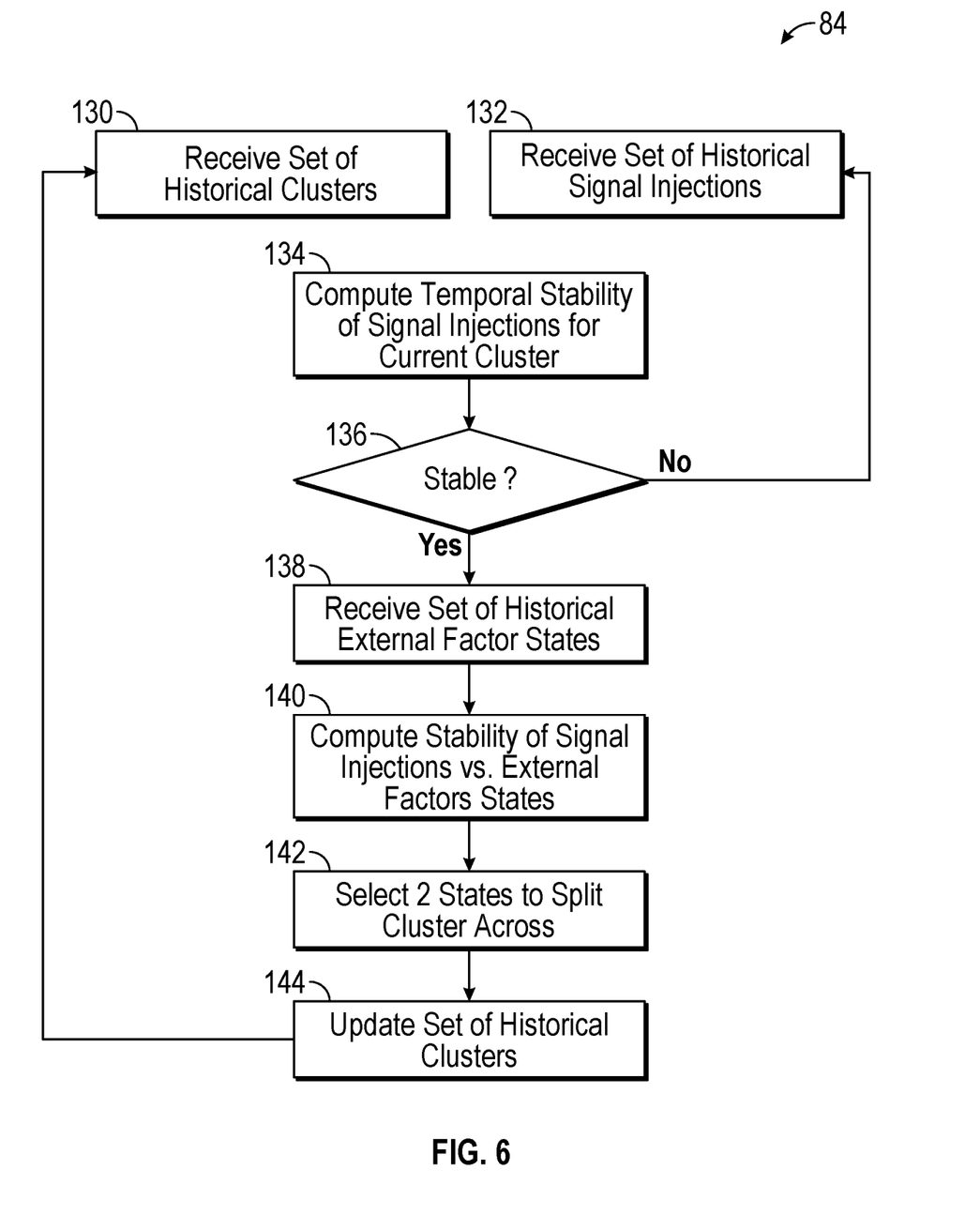
FIG. 6 is a flow chart of a memory management method for the system.

FIG. 6 is a flow chart of a memory management method for the modules and processes in section 84 of the system. The memory management method includes the following steps: receive set of historical clusters 130; receive set of historical signal injections 132; and compute temporal stability of signal injections for current clusters 134. If the signal injections from step 134 are stable 136, then the memory management method executes the following steps: receive set of historical external factor states 138; compute stability of signal injections versus external factors states 140; select two states to split cluster across 142; and update set of historical clusters 144.

Table 1 provides descriptions of key processes for the system. Tables 2-5 provide exemplary use cases for applying the methods of the causal analytics system.

The signal injections are changes in powertrain controls such as variables and parameters relating to powertrain management and control. Tables 2-5 provide examples of variables that can be leveraged for signal injection, the sensors that can be monitored to measure utility, the utility functions that can be used to drive the optimization of control decisions, and external factors that can influence the optimality of those decisions. The responses to signal injection are typically powertrain safety and performance measures resulting or related to the changes in powertrain controls from the signal injection. For example, a particular value can be inserted as a signal injection into the Engine Control Unit to the subcomponents of the powertrain, and the inserted value can be tracked within a normal or typical range. Also in this example, the value can be continuously changed and re-inserted in an iterative manner as a signal injection based upon the responses to previous values of the signal in order to find the optimal value under particular conditions. The signal injections typically occur while a vehicle is in operation but can also occur within the vehicle at other times. The temporal and spatial reaches of signal injections relate to, respectively, when and where to measure the response signals to those signal injections that are used for computing causal relationships. The cost of signal injection typically relates to how the signal injection affects vehicle performance, for example signal injection can result in lower vehicle performance, and is controlled by the specified experimental range. The queue for signal injection involves the order and priority of signal injections and relies on blocking and randomization to guarantee high internal validity at all times, even when optimizing utility. The utility of responses to signal injection involves the effectiveness of the signal injections or other measures of utility.

TABLE 1

| Key Process | Description and Examples |
| --- | --- |
| Objective goals | Power, torque, top speed, fuel economy, gas and particulate emissions, thermal efficiency, volumetric efficiency, brake power, engine life, noise/vibrations, combustion stability, battery life |
| Control systems hard constraints | Physical constraints associated with existing design (e.g., crank angle range, maximum cylinder pressure, rev limit), operating ranges prone to knocking (e.g., low fuel-air ratio) |
| Normative operational data | Existing engine calibration look-up tables. Signal injection is designed to mimic normal operations until variance in utility is detected and exploited |
| Minimum/maximum temporal reach | Time delays between fuel injection, spark ignition, pressure rise and gas exhaust, battery/capacitor charge/discharge time |
| Minimum/maximum spatial reach | Reaction and oxidation of particulate matter/soot along catalytic exhaust path |
| Generation of experimental units | Identify stochastically equivalent spatial-temporal units, i.e. where the experimental conditions are equivalent and where the units' duration is pareto optimize to minimize carry-over effects while maximizing statistical power |
| Treatment assignment | Random and blocked assignment of control variations with assignment frequencies following normal operations until variance in utility is detected and exploited |
| Explore/exploit management | Probability matching of confidence interval (CI) overlaps to explore frequencies where smaller overlaps between CIs result in more frequent use of the level associated with the highest utility |
| Baseline monitoring | Baseline is monitored in real-time through periodic random assignment to provide an unbiased measure of utility improvement |
| Data inclusion window | Confidence intervals are computed over a pareto optimum data inclusion window that provides a trade-off between precision (narrow confidence intervals) and accuracy as conditions change over time, for example as the engine ages. |
| Clustering of experimental units | Signal injection and treatment assignment can be optimized conditionally based on external factors outside of experimental control, for example altitude (oxygen content), weather (external temperature), engine temperature (cold start), load, fuel composition |

TABLE 2

Real-time control and optimization of internal combustion
engine for fuel consumption, performance, or other factors

| Controls | Sensors | Figures of merit | External factors |
|---|---|---|---|
| Variable spark timing, Variable valve timing, Variable compression ratio, Variable displacement (cylinder deactivation), Variable air-fuel ratio, Variable idle speed (including stop/start), Variable boost (turbocharger) | Crankshaft position sensor, In-cylinder pressure, Exhaust gas temperature, Engine, oil, coolant temperature, Oxygen sensor, Combustion phase indicator | Power, Torque, Top speed, Fuel economy, Particulate emissions, Thermal efficiency, Volumetric efficiency, Heat release rate, Engine wear/life | Fuel composition, Engine speed, Load, Engine temperature (cold start vs warmed up), Friction losses (including tire pressure), Weather (including external temperature), Location (including altitude and oxygen content) |

TABLE 3

Real-time control and optimization of homogeneous
charge compression ignition (HCCI)

| Controls | Sensors | Figures of merit | External factors |
|---|---|---|---|
| Variable compression ratio, Variable air-fuel mixture preparation, Variable air-fuel ratio, Variable spark timing, Variable valve timing, Variable intake air pressure and temperature, Variable exhaust gas recirculation, Variable idle speed Variable boost (turbocharger) | Knock sensor, Crankshaft position sensor, In-cylinder pressure Exhaust gas temperature, Engine, oil, coolant temperature, Oxygen sensor, Combustion phase indicator | Combustion stability, Fuel sensitivity, Power, Torque, Top speed, Fuel economy, Particulate emissions, Thermal efficiency, Volumetric efficiency, Heat release rate, Engine wear/life | Fuel composition (including fuel additives), Engine speed, Load, Engine temperature (cold start vs warmed up), Friction losses (including tire pressure), Weather (including external temperature), Location (including altitude and O2 content) |

TABLE 4

Real-time control and optimization of reactivity-
controlled compression ignition (RCCI)

| Controls | Sensors | Figures of merit | External factors |
|---|---|---|---|
| Variable number of injections, Variable injection timing and duration, Variable compression ratio, Variable air-fuel mixture preparation, Variable air-fuel ratio, Variable spark timing, Variable valve timing, Variable intake air pressure and temperature, Variable exhaust gas recirculation, Variable idle speed Variable boost (turbocharger) | Knock sensor, Crankshaft position sensor, In-cylinder pressure, Exhaust gas temperature, Engine, oil, coolant temperature, Oxygen sensor, Combustion phase indicator | Combustion stability, Fuel sensitivity, Power, Torque, Top speed, Fuel economy, Particulate emissions, Thermal efficiency, Volumetric efficiency, Heat release rate, Engine wear/life | Fuel composition (including fuel additives, fuel blends), Engine speed, Load, Engine temperature (cold start vs warmed up), Friction losses (including tire pressure), Weather (including external temperature), Location (including altitude and O2 content) |

TABLE 5

Real-time control and optimization of hybrid powertrain

| Controls | Sensors | Figures of merit | External factors |
|---|---|---|---|
| Variable mode: electric only, hybrid/electric assist, battery charging, regenerative braking, Variable use of electric motor, Variable use and optimization of internal combustion engine (use case 1), Variable regenerative braking | Battery charge meter, Fuel level sensor, Throttle position, Engine speed, Efficiency of the internal combustion engine | Power, Torque, Top speed, Fuel economy, Particulate emissions, Battery life, Thermal efficiency, Volumetric efficiency, Engine wear/life | HVAC load Engine temperature (cold start vs warmed up), Weather (including external temperature), Location (including altitude and O2 content) |

Table 6 provides an algorithm of an embodiment for automatically generating and applying causal knowledge to the management of a powertrain system in a vehicle. This algorithm can be implemented in software or firmware for execution by processor 20.

TABLE 6

1. inject randomized controlled signals in powertrain control decisions; provide signal injections via processor 20 into powertrain management module 22 or powertrain subcomponents
2. ensure signal injections occur within normal operational ranges and constraints
3. receive data from the plurality of sensors 12, 14, and 16 associated with the vehicle 10 and parse those data into system responses associated with injected signals
4. compute causal knowledge about the relationship between powertrain signals and measured utility
5. select optimal signals for the powertrain management module 22 based on current causal knowledge and uncertainty about expected utility Collaborative learning can greatly improve the granularity and accuracy of causal knowledge by allowing stochastically equivalent trials across vehicles resulting in increased statistical power. Analysis of variance (ANOVA) is then used to identify dimensions where causal knowledge differs across vehicles and cluster experimental units across those dimensions.

EXAMPLES

Example 1—Automated Component Calibration

A number of components in the powertrain (e.g., sensors, electronic control units) are calibrated so that the measured analog signals associated with those components are properly interpreted to accurately represent their current state of operation. Such calibration typically includes classifying combinations of sensor readings into different classes indicative of a particular state or goal, for example Good/Fair/Bad or Sport/Comfort/Eco. Aging, vehicle-to-vehicle variations and environmental factors all contribute to reducing the classification accuracy for a given vehicle at a given time. Accuracy is typically evaluated and reported as a confusion matrix that quantifies type I and II error rates (i.e. false positive and false negatives). The outcome of component calibration is the determination of an optimum parameter—known as the criterion for classification (beta) in signal detection theory—which can be thought of as the optimum threshold value that delimitates two distinct classes based on the received signal value and minimizes the rate and/or cost of misclassification.

In today's distributed Electronic/Electrical (E/E) architecture, feedback loop control systems are used whenever possible to continuously maintain high classification accuracy for individual components. Such strategy works well when accuracy itself is directly knowable (i.e. the delta between the desired state and the actual state of the component is measurable) and there is a direct one-to-one causal relationship between controls (e.g. gain) and accuracy. As the E/E architecture migrates toward a more centralized approach, characterization and optimization of classification accuracy from multi-modal sensor data will become more ambiguous due to the increase in system complexity and interconnectivity. Provided that the utility of accurate versus inaccurate classification can be measured through safety, performance or other utility metrics, the present method continuously perturbs the value of beta within an operationally acceptable range (beta+/−dbeta, dbeta<<beta) and measures its impact on utility over time. Based on this learning, it continuously recalibrates the optimum value for beta to maximize classification accuracy when knowable or utility when accuracy itself isn't directly measurable and must be inferred. Such optimization can be conducted even under non-stationarity conditions, e.g. sensor aging, changing atmospheric conditions or changing goals with different false positive and false negative costs. Thus, while vehicles may start with pre-programmed rules and models to interpret various sensor inputs, the present approach continuously improves on those rules and models over the life of the vehicle as well as collaboratively across vehicles by fine-tuning all classification criteria across more granular states of world.

Example: the measured signal corresponding to "Signal absent" (or state #1) and the measured signal corresponding to "Signal present" (or state #2) can overlap due to noise in the signal. The noise distribution, the center value of the measured signal, and the costs associated with "Miss" and "False alarm" may change over time, resulting in different optimum values for the classification criterion beta. By continuously varying beta through small perturbations (i.e. signal injections) and measuring utility, the criterion value can continuously be re-optimized.

Example 2—Automated Queue Prioritization

Under operations, modern vehicles ECUs (Engine/Electronic Control Unit) receive many signals from multiple components and sensors in the powertrain. Sometimes these signals may be uncertain or contradictory when they carry information indicating conflicting goals or cumulative goals that exceed the available resources. In these situations, the ECU needs to determine which signals receive priority over others in driving decision making based on their attributes and other external factors. Pre-defined general rules can be used to prioritize certain input signals over others, for example signals related to safety receive priority over signals related to performance. Large subsets of input signals may still be perceived as having equal priority under these general rules because further prioritization is contingent on the specific state of the world at that particular instant. Within each of these pools of seemingly equal priority signals having different attributes and addressing different goals, the present method randomly assigns different levels of priority to different signals. Over time, it develops knowledge about the causal relationships between signal attributes and utility of prioritizing such signals under various circumstances thus enabling improved prioritization of input signals conditional on their attributes as well as other external factors (e.g., operational goals, load, weather, and other factors). Maximizing utility in this case can generally be defined as minimizing opportunity cost, i.e. maximizing the benefits (including reducing risk) associated with prioritizing certain signals given the available resources. A common example for this sort of problem is predictive maintenance: conducting maintenance too early ties up resources (human, financial, material) that would be better deployed elsewhere while conducting maintenance too late can be very resource consuming and costly (loss of productivity).

Example: the ECU receives a number of input signals from 8 sensors. Pre-determined criteria are used to pool these signals into a "Highest Priority," "Middle Priority," and "Lowest Priority". Within each pool, multiple signals of seemingly equal priority may compete for attention and resources. By continuously altering their priority (i.e. their order in the scheduled queue) based on their attributes/characteristics, the system learns which ones of those attributes and characteristics are most indicative of priority given the current level of resources, external conditions, and possibly other factors. While the initial criteria to define the three main priority pools may be general enough to apply under all driving conditions (e.g., safety vs. performance), criteria used within each pool are likely to be conditional on a number of dynamic factors.

Example 3—Automated System Optimization

Optimum powertrain management today is achieved through extensive testing under a wide variety of conditions to try and develop exhaustive look-up tables that cover any and all driving conditions a driver may encounter. In practice, most vehicles will encounter only a very small subset of those driving conditions, and within the conditions actually sampled the pre-defined look-up tables may lack the granularity (across existing dimensions) or the dimensionality (across additional factors) necessary to further optimize operations for performance, reliability, comfort, and safety. In addition, the optimum look-up table for engine management is likely to evolve from beginning to end of life of the vehicle due to component aging. The present method continuously experiments on combinations and timing of system controls to learn their effects on utility, and in effect continuously re-estimate the local gradient of the response surface associated with the pre-calibrated look-up table. This knowledge can in turn be used to seamlessly optimize powertrain operations in real-time even when subject to significant changes in both task and environment.

Practical implementation can be accomplished in a number of ways. The least disruptive and least sophisticated approach consists in not changing the look-up table, which is typically stored on the ECU's firmware, and rather to experiment on which setting is selected within the existing table (e.g. pick the nearest-neighbor to the recommended setting). The next approach consists in storing multiple variations of the look-up table on the firmware and to experiment on which table is optimum for driving decision making. As RAM memories and over-the-air programming become more mainstream and enable live tuning of ECU's look-up tables, it is now possible to experiment on individual look-up table values and continuously update the entire table. Finally, the most disruptive and sophisticated implementation is to self-generate the look-up table as causal knowledge accumulates and forms the new basis for decision making.

Example: a vehicle has a pre-defined look-up table for engine management that was develop by the manufacturer after years of testing. The table represents the average optimum setting given all possible driving conditions a driver may encounter through the life of the vehicle. At any particular instant though, such settings may be sub-optimal given the available operational range. By continuously varying the recommended setting through small perturbations (i.e. signal injections) and measuring utility, the look-up table can be continuously updated. In addition, different look-up tables can be developed through clustering corresponding to different driving conditions or state of the vehicle.

The invention claimed is:

1. A method for management of a powertrain system in a vehicle, comprising the steps of:
   injecting randomized controlled signals into powertrain control decisions of a powertrain control system;
   ensuring that the injected randomized controlled signals occur within hard constraints of the powertrain control system;
   receiving sensor data from a plurality of sensors associated with the vehicle in response to the injected randomized controlled signals;
   receiving electronic control unit data from a plurality of electronic control units associated with the powertrain control system in response to the injected randomized controlled signals and parsing the sensor data and the electronic control unit data into responses of the powertrain control system associated with the injected randomized controlled signals;
   computing confidence intervals relating to a causal relationship between powertrain signals and a measured utility based on the injected randomized controlled signals, the sensor data, and the electronic control unit data; and
   selecting operational signals for the powertrain control decisions of the powertrain control system based on the computed confidence intervals.

2. The method of claim 1, wherein the selected operational signals comprise actions, queue orders, sensor calibrations, or any combination thereof.

3. The method of claim 1, wherein the hard constraints comprise a multidimensional space of possible control states generated based on control information and operational constraints.

4. The method of claim 1, wherein the parsing of the sensor data is continuously adjusted in space and time to maximize variance across signal injections of the randomized controlled signals.

5. The method of claim 1, wherein the method is continuously repeated throughout a lifetime of the vehicle to account for dynamic effects such as aging, component replacement, or changing environments.

6. The method of claim 1, wherein the step of injecting randomized controlled signals further comprises injecting at least one placebo signal into the powertrain control decisions.

7. The method of claim 5, wherein the selected operational signals change over time depending on a driver's preference, road conditions, atmospheric condition, traffic condition, vehicle condition, or any combination thereof.

8. The method of claim 1, wherein the selected operational signals depend on a look-up table in an engine control unit.

9. A method for management of a plurality of powertrain systems in a plurality of vehicles, the plurality of vehicles in communication with one another, comprising the steps of:

injecting randomized controlled signals into powertrain control decisions of a plurality of powertrain control systems corresponding to each of the plurality of vehicles;

ensuring that the injected randomized controlled signals occur within hard constraints of each of the powertrain control systems of each vehicle;

receiving sensor data from a plurality of sensors associated with each of the vehicles in response to the respective injected randomized controlled signals of each vehicle;

receiving electronic control unit data from a plurality of electronic control units associated with each of the powertrain control systems in response to the respective injected randomized controlled signals and parsing the respective sensor data and the respective electronic control unit data into responses of each of the powertrain control systems associated with the respective injected randomized controlled signals;

computing confidence intervals relating to a plurality of causal relationships between respective powertrain signals for each vehicle and a plurality of measured utilities for each vehicle based on the respective injected randomized controlled signals, the respective sensor data, and the respective electronic control unit data of each vehicle;

selecting operational signals for the powertrain control decisions of each of the respective powertrain control systems of each vehicle based on the respective computed confidence intervals.

* * * * *